(12) United States Patent
Chu et al.

(10) Patent No.: US 12,499,237 B2
(45) Date of Patent: Dec. 16, 2025

(54) MEMORY DEVICE, OPERATION METHOD OF MEMORY DEVICE, AND AUTHENTICATION SYSTEM OF MEMORY DEVICE

(71) Applicant: Samsung Electronics Co., Ltd., Suwon-si (KR)

(72) Inventors: Younsung Chu, Suwon-si (KR); Jisoo Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 112 days.

(21) Appl. No.: 18/510,881

(22) Filed: Nov. 16, 2023

(65) Prior Publication Data

US 2024/0176886 A1 May 30, 2024

(30) Foreign Application Priority Data

Nov. 25, 2022 (KR) .......................... 10-2022-0160799

(51) Int. Cl.
*G06F 21/57* (2013.01)
*G06F 21/79* (2013.01)

(52) U.S. Cl.
CPC ............ *G06F 21/575* (2013.01); *G06F 21/79* (2013.01)

(58) Field of Classification Search
CPC .............................. G06F 21/575; G06F 21/79
See application file for complete search history.

(56) References Cited

U.S. PATENT DOCUMENTS

| 8,667,263 | B2 | 3/2014 | Challener et al. |
| 9,059,855 | B2 | 6/2015 | Johnson et al. |
| 10,409,985 | B2 | 9/2019 | Potlapally et al. |
| 11,157,623 | B2 | 10/2021 | Pappachan et al. |
| 11,468,171 | B2 * | 10/2022 | Strong ....................... G06F 8/60 |
| 2020/0089507 | A1 * | 3/2020 | Froehlich .............. H04L 9/3247 |
| 2021/0004466 | A1 * | 1/2021 | Nadarajah ............. G06F 21/572 |
| 2021/0081537 | A1 * | 3/2021 | Strong .................... G06F 9/441 |
| 2022/0116460 | A1 * | 4/2022 | Ponnuru ............... H04L 67/141 |
| 2022/0237295 | A1 * | 7/2022 | Hu ........................ H04L 9/3263 |
| 2022/0245252 | A1 | 8/2022 | Smith et al. |
| 2022/0255916 | A1 | 8/2022 | Smith et al. |
| 2023/0393973 | A1 * | 12/2023 | Poornachandran ......................... G06F 12/0246 |

(Continued)

*Primary Examiner* — Zahid Choudhury
(74) *Attorney, Agent, or Firm* — Harness, Dickey & Pierce, P.L.C.

(57) ABSTRACT

Provided is a system including a memory device including an interface configured to receive a measurement value generation request signal from a host and transmit a first measurement value and a second measurement value to the host, attester firmware configured to receive measurement values for a plurality of pieces of firmware, a bootloader configured to perform booting, a first register configured to record a first measurement value of the bootloader, and a second register configured to record a second measurement value for the attester firmware in response to the first measurement value being recorded, and the host including processing circuitry configured to receive the first measurement value and the second measurement value, and determine whether to falsify the bootloader or the attester firmware based on at least one of (1) the first measurement value and first reference values or (2) the second measurement value and second reference values.

20 Claims, 12 Drawing Sheets

(56) References Cited

U.S. PATENT DOCUMENTS

2024/0419608 A1* 12/2024 Park .................... G06F 12/1408
2024/0427896 A1* 12/2024 Shroff ................... G06F 21/575

* cited by examiner

MEMORY DEVICE, OPERATION METHOD OF MEMORY DEVICE, AND AUTHENTICATION SYSTEM OF MEMORY DEVICE

CROSS-REFERENCE TO RELATED APPLICATION

This application is based on and claims priority under 35 U.S.C. § 119 to Korean Patent Application No. 10-2022-0160799, filed on Nov. 25, 2022, in the Korean Intellectual Property Office, the disclosure of which is incorporated by reference herein in its entirety.

BACKGROUND

The inventive concepts relate to a memory device, an operation method of the memory device, and an authentication system of the memory device, and more particularly, to a memory device capable of directly reporting to a host whether a bootloader and firmware are falsified, an operation method of the memory device, and an authentication system of the memory device.

When the bootloader or firmware is falsified during a boot process of a memory device, such as a solid state drive (SSD) device, the memory device may not perform a safe boot. In order to perform safe booting, the memory device itself verifies whether the components of the memory device have been falsified.

However, no verification has been made to date of the method of reporting directly to the host whether the bootloader or firmware of the memory device is falsified. Since whether the bootloader or the firmware is falsified is not directly reported to the host, there is a problem that it is impossible to determine why the booting has failed when the booting fails.

SUMMARY

The inventive concepts provide a memory device and a method of directly determining whether a bootloader and firmware are falsified in a host.

According to some example embodiments of the inventive concepts, there is provided a system including a memory device including an interface configured to receive a measurement value generation request signal from a host and transmit a first measurement value and a second measurement value to the host, attester firmware configured to receive measurement values for a plurality of pieces of firmware, a bootloader configured to perform booting, a first register configured to record a first measurement value of the bootloader, and a second register configured to record a second measurement value for the attester firmware in response to the first measurement value being recorded, and the host including processing circuitry configured to receive the first measurement value and the second measurement value, and determine whether to falsify the bootloader or the attester firmware based on both of (1) the first measurement value and first reference values and (2) the second measurement value and the second reference values.

According some example embodiments of the inventive concepts, there is provided an operation method of a system, the method including receiving a measurement value generation request signal from a host, recording a first measurement value of a bootloader, recording a second measurement value of an attester firmware in response to the first measurement value being recorded, and determining whether the bootloader or the attester firmware are falsified based on both of (1) the first measurement value and first reference values and (2) the second measurement value and second reference values.

According to some example embodiments of the inventive concepts, there is provided an authentication system including a memory device including an interface configured to receive a measurement value generation request signal from a host and transmit a first measurement value and a second measurement value to the hose, attester firmware configured to receive measurement values for a plurality of firmware, a bootloader configured to perform booting, a first register configured to record a first measurement value of the bootloader, and a second register configured to record a second measurement value for the attester firmware in response to the first measurement value being recorded, and the host including processing circuitry configured to receive the first measurement value and the second measurement value, and determine whether the bootloader or the attester firmware are falsified based on at least one of (1) the first measurement value and first reference values or (2) the second measurement value and second reference values.

BRIEF DESCRIPTION OF THE DRAWINGS

Some example embodiments of the inventive concepts will be more clearly understood from the following detailed description taken in conjunction with the accompanying drawings in which.

DETAILED DESCRIPTION OF THE EMBODIMENTS

Terms used in the present specification will be briefly described, and some example embodiments will be described in detail.

Figure 1:
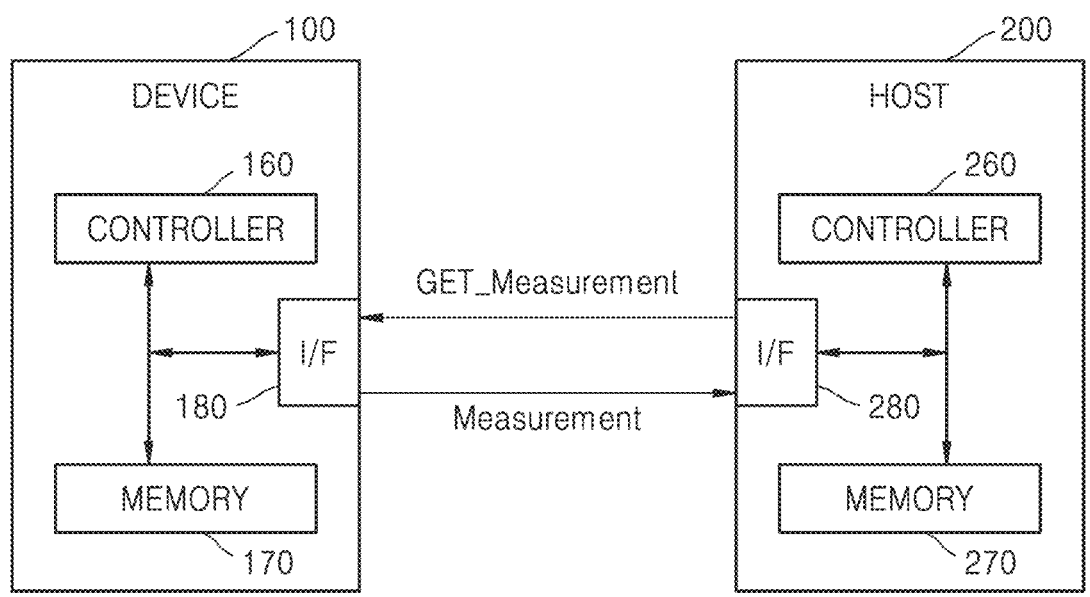
FIG. 1 illustrates an authentication system of a memory device according to some example embodiments of the inventive concepts.

FIG. 1 is a block diagram of a system 10 according to some example embodiments of the inventive concepts.

Referring to FIG. 1, the system 10 according to some example embodiments may include a memory device 100 and/or a host 200.

The memory device 100 may include a controller 160, a memory 170, and/or an interface 180.

The memory device 100 according to some example embodiments may receive a measurement value request signal GET_Measurement from the host 200 and generate a plurality of measurement values. For example, the memory device 100 may generate measurement values Measurement of a bootloader, attester firmware Attester_FW, or a plurality of pieces of firmware FW. For example, the memory device 100 may receive the measurement value request signal GET_Measurement and transmit the plurality of measurement values via the interface 180.

The memory 170 according to some example embodiments may include storage media for storing data. For example, the memory device 100 may include a solid state disk (SSD) device and/or a universal flash storage (UFS) device. The storage media of the memory device 100 may include a plurality of memory cells, for example, flash memory cells. For example, the storage media may include volatile memory such as dynamic random-access memory (DRAM), static random-access memory (SRAM), etc., and/or nonvolatile memory such as electrically erasable programmable read-only memory (EEPROM), ferroelectric random-access memory (FRAM), phase-change random-access memory (PRAM), magnetic random-access memory (MRAM), Flash Memory, etc.

The host 200 may include a controller 260, a memory 270, and/or an interface 280. The memory 270 may function as a buffer memory for temporarily storing data to be transmitted to the memory device 100 or data transmitted therefrom. The controller 260 may be any one of modules included in an application processor, and the application processor may be realized as a System on Chip (SoC). Also, the memory 270 may be an embedded memory included in the application processor, or a non-volatile memory or a memory module outside the application processor. The interface 280 may send and/or receive data between the host 200 and the memory device 100. For example, the interface may send a measurement value request signal GET_Measurement.

The host 200 according to some example embodiments may transmit, to the memory device 100, signals for performing an authentication operation of the memory device. For example, the host 200 may transmit a measurement value generation request signal GET_Measurement to the memory device 100 to determine whether the components included in the memory device 100 are falsified, and may receive measurement values Measurements of a bootloader, attester firmware Attester_FW, or a plurality of pieces of firmware FW. The host 200 according to some example embodiments may perform an authentication operation on the components of the memory device 100. For example, the host 200 may receive measurement values Measurement of the bootloader, the attester firmware Attester_FW, and/or the plurality of pieces of firmware FW, and may determine whether the bootloader, the attester firmware Attester_FW, and/or the plurality of pieces of firmware FW are falsified based on the received measurement values Measurement. The host 200 according to some example embodiments may directly receive the measurement values Measurement and perform secure booting when determining whether the components of the memory device 100 are falsified.

The host 200 according to some example embodiments may compare a first measurement value MB with a preset reference value of the bootloader, and determine that the bootloader 120 (of FIG. 2) is falsified when it is determined that the first measurement value MB differs from the preset reference value of the bootloader as a comparison result. The preset reference value of the bootloader according to some example embodiments may be a value input by the manufacturer of the memory device 100.

Figure 2:
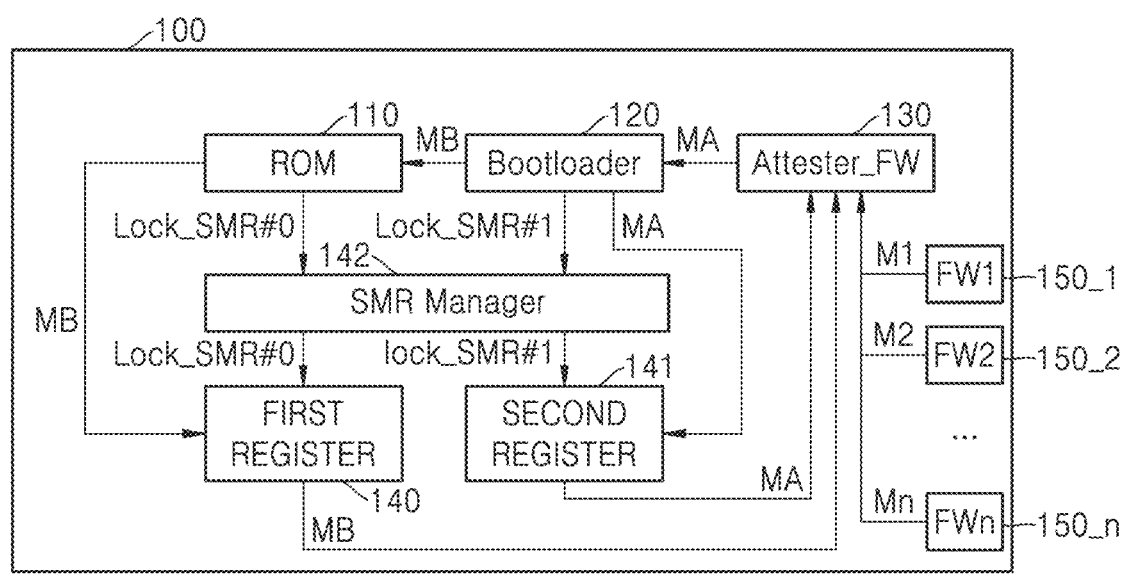
FIG. 2 is a block diagram of a device according to some example embodiments of the inventive concepts.

FIG. 2 is a block diagram of a memory device 100 according to some example embodiments of the inventive concepts.

The host 200 according to some example embodiments may compare a second measurement value MA with a preset reference value of the attester firmware, and determine that attester firmware 130 (of FIG. 2) is falsified when it is determined that the second measurement value MA differs from the preset reference value of the attester firmware 130 as a comparison result. The preset reference value of the attester firmware 130 according to some example embodiments may be a value input by the manufacturer of the memory device 100.

The host 200 according to some example embodiments may compare preset reference values of a plurality of pieces of firmware with measurement values M1, M2, . . . , Mn of a plurality of pieces of firmware, which are received from the attester firmware 130, and determine that at least one of a plurality of pieces of firmware 150_1, 150_2, . . . , 150_n is falsified when the measurement values M1, M2, . . . , Mn of the plurality of pieces of firmware 150_1, 150_2, . . . , 150_n, which are received from the attester firmware 130, differ from the preset reference values of the plurality of pieces of firmware 150_1, 150_2, . . . , 150_n as a result of the comparison. The preset reference values of a plurality of pieces of firmware 150_1, 150_2, . . . , 150_n according to some example embodiments may be values input by the manufacturer of the memory device 100.

Referring to FIG. 2, the memory device 100 according to some example embodiments may include read-only memory (ROM) 110, a bootloader 120, attester firmware 130 Attester_FW, a plurality of registers, that is, first and second registers 140 and 141, a register manager SMR Manager 142, and/or a plurality of pieces of firmware FW1, FW2, . . . , FWn, which are denoted as 150_1, 150_2, . . . , 150_n. The bootloader 120, the attester firmware 130 Attester_FW, the register manager SMR Manager 142, and/or the plurality of pieces of firmware FW1, FW2, . . . , FWn may be implemented by the controller 160. However, example embodiments are not limited thereto.

The ROM 110 according to some example embodiments may perform authentication on the bootloader 120. For example, the first measurement value MB may be received from the bootloader 120, and the received first measurement value MB may be recorded in the first register 140. The ROM 110 according to some example embodiments may perform an authentication operation on the bootloader 120 before the bootloader 120 is executed. When the first measurement value MB is recorded in the first register 140, the ROM 110 according to some example embodiments may generate a write prohibition request signal Lock_SMR #0 for the first register 140, and transmit the generated write prohibition request signal Lock_SMR #0 to the register manager 142 so that the value recorded in the first register 140 is not changed. Here, the first measurement value MB may be defined as a measurement value generated by the bootloader 120. Hereinafter, in some example embodiments, the first measurement value MB may be defined as a measurement value generated by the bootloader 120.

The bootloader 120 according to some example embodiments may perform a booting operation of the memory device 100. The bootloader 120 according to some example embodiments may perform an authentication operation on the attester firmware 130 while performing a booting operation. For example, when the bootloader 120 is executed, the bootloader 120 may receive the second measurement value MA from the attester firmware 130 and record the received second measurement value MA in the second registers 141. When the second measurement value MA is recorded in the second register 141, the bootloader 120 according to some example embodiments may generate a write prohibition request signal Lock_SMR #1 for the second register 141, and transmit the generated write prohibition request signal to the register manager 142 so that the value recorded in the second register 141 does not change. Here, the second measurement value MA may be defined as a measurement value generated by the attester firmware 130. Hereinafter, in some example embodiments, the second measurement value MA may be defined as a measurement value generated by the attester firmware 130.

The attester firmware 130 according to some example embodiments may receive measurement values for the plurality of pieces of firmware. For example, the attester firmware 130 may receive measurement values M1, M2, . . . , Mn for determining whether the plurality of pieces of firmware are falsified while the plurality of pieces of firmware are executed. The attester firmware 130 according to some example embodiments may transmit the second measurement value MA to the bootloader 120. In addition, the attester firmware 130 according to some example embodiments may read the first measurement value MB and the second measurement value MA.

The first register 140 according to some example embodiments may record and store the first measurement value MB of the bootloader 120. For example, the first register 140 may receive the first measurement value MB from the ROM 110 and record the first measurement value MB therein. When the first measurement value MB is recorded, the first register 140 according to some example embodiments may receive a write prohibition request signal Lock_SMR #0 for the first register and stop recording the measurement value.

When the first measurement value MB is recorded, the second register 141 according to some example embodiments may record and store the second measurement value MA for the attester firmware 130. For example, the second register 141 may receive the second measurement value MA from the bootloader 120 and record the second measurement value MA therein. When the second measurement value MA is recorded, the second register 141 according to some example embodiments may receive a write prohibition request signal Lock_SMR #1 for the second register 141 and stop recording the measurement value.

The register manager 142 according to some example embodiments may control recording of the first register 140 and the second register 141. For example, when the first measurement value MB is recorded in the first register 140, the register manager 142 may transmit a write prohibition request signal Lock_SMR #0 to the first register 140 to prohibit recording of the first register 140. When the first measurement value MB is recorded, the register manager 142 according to some example embodiments may record the second measurement value MA in the second register 141, and transmit a write prohibition request signal Lock_SMR #1 to the second register 141 to prohibit the recording of the second register 141 when the second measurement value MA is recorded in the second register 141.

The plurality of pieces of firmware 150_1, 150_2, . . . , 150_n according to some example embodiments may control a plurality of operations performed in the system 10. For example, the plurality of pieces of firmware 150_1, 150_2, . . . , 150_n may store programs executed in the system 10 and allow the stored programs to be executed based on received instructions (not shown). In addition, the plurality of pieces of firmware 150_1, 150_2, . . . , 150_n according to some example embodiments may generate measurement values M1, M2, . . . , Mn, and transmit the generated measurement values M1, M2, . . . , Mn to the attester firmware 130. For example, the attester firmware 130 may read each of the measurement values M1, M2, . . . , Mn to determine whether the plurality of pieces of firmware 150_1, 150_2, . . . , 150_n are falsified.

Figure 3:
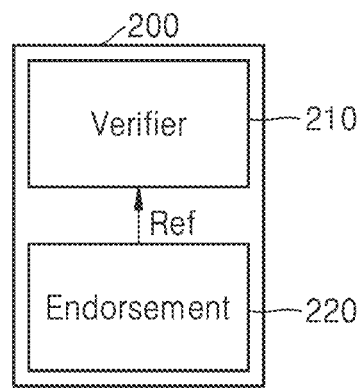
FIG. 3 is a block diagram of a host according to some example embodiments of the inventive concepts.

FIG. 3 is a block diagram of a host 200 according to some example embodiments of the inventive concepts.

Referring to FIG. 3, the host 200 according to some example embodiments may include a verifier 210 and an endorsement 220. The verifier 210 and/or the endorsement 220 may be implemented by the controller 260. However, example embodiments are not limited thereto.

The verifier 210 according to some example embodiments may receive measurement values Measurement from the memory device 100, and compare the received measurements with preset (or alternately given) reference values to determine whether the memory device 100 is falsified. For example, the verifier 210 may read preset (or alternately given) reference values Ref from the endorsement 220 and compare the measurement values Measurement received from the attester firmware 210 with the preset (or alternately given) reference values Ref. The measurement values Measurement according to some example embodiments may include the first measurement value MB, the second measurement value MA, and/or the measurement values M1, M2, . . . , Mn for the plurality of pieces of firmware 150_1, 150_2, . . . , 150_n. In addition, the preset (or alternately given) reference values Ref according to some example embodiments may include a reference value for the first measurement value, a reference value for the second measurement value, and/or reference values of measurement values for the plurality of pieces of firmware 150_1, 150_2, . . . , 150_n.

The verifier 210 according to some example embodiments may compare the first measurement value MB with the preset (or alternately given) reference value of the bootloader 120, and determine that the bootloader 120 is falsified when it is determined that the first measurement value MB differs from the preset (or alternately given) reference value of the bootloader as a comparison result. The preset (or alternately given) reference value of the bootloader 120 according to some example embodiments may be a value input by the manufacturer of the memory device 100.

The verifier 210 according to some example embodiments may compare the second measurement value MA with the preset (or alternately given) reference value of the attester firmware 130, and determine that the attester firmware 130 is falsified when it is determined that the second measurement value MA differs from the preset (or alternately given) reference value of the attester firmware 130 as a comparison result. The preset (or alternately given) reference value of the attester firmware 130 according to some example embodiments may be a value input by the manufacturer of the memory device 100.

The verifier 210 according to some example embodiments may compare the preset (or alternately given) reference values of the plurality of pieces of firmware 150_1, 150_2, . . . , 150_n with the measurement values M1, M2, . . . , Mn of a plurality of pieces of firmware, which are received from the attester firmware 130, and determine that at least one of the plurality of pieces of firmware 150_1, 150_2, . . . , 150_n is falsified when the measurement values M1, M2, . . . , Mn of the plurality of pieces of firmware, which are received from the attester firmware 130, differ from the preset (or alternately given) reference values of the plurality of pieces of firmware 150_1, 150_2, . . . , 150_n as a result of the comparison. The preset (or alternately given) reference values of a plurality of pieces of firmware 150_1, 150_2, . . . , 150_n according to some example embodiments may be values input by the manufacturer of the memory device 100.

The endorsement 220 according to some example embodiments may store preset (or alternately given) reference values Ref for the plurality of measurement values. The preset (or alternately given) reference values Ref according to some example embodiments may be reference values for determining whether the memory device 100 is falsified. For example, in order to compare the measurement values Measurement received from the attester firmware 130, the manufacturer may store the preset (or alternately given) reference values Ref in the endorsement 220. The preset (or alternately given) reference values Ref according to some example embodiments may include a reference value for the first measurement value, a reference value for the second measurement value, and/or reference values of measurement values for the plurality of pieces of firmware.

Figure 4A:
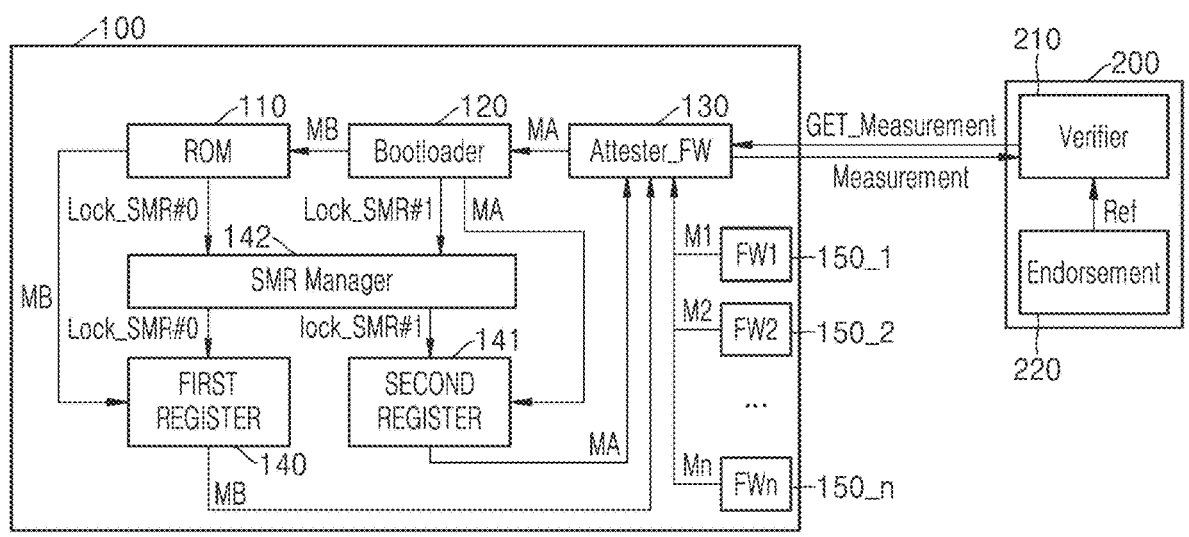
FIGS. 4A and 4B are block diagrams of memory devices according to some example embodiments of the inventive concepts, respectively.
Figure 4B:
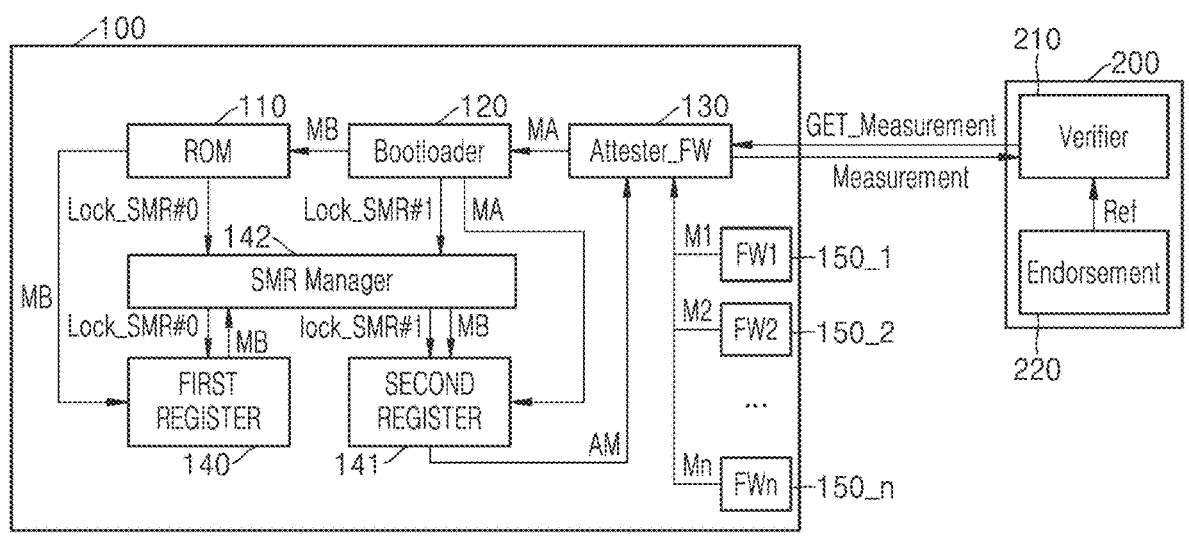

FIGS. 4A and 4B are block diagrams of memory devices 100 according to some example embodiments of the inventive concepts, respectively.

Referring to FIG. 4A, the system 10 according to some example embodiments may determine whether the memory device 100 is falsified based on a measurement value Measurement transmitted by the memory device 100 to the host 200.

Before the boot operation of the memory device 100 is performed, the ROM 110 according to some example embodiments may receive the first measurement value MB from the bootloader 120 and record the received first measurement value MB in the first register 140. When the first measurement value MB is recorded, the register manager 142 according to some example embodiments may prohibit recording of the first register 140 and may execute the bootloader 120 to perform a boot operation.

When the boot operation is performed, the memory device 100 according to some example embodiments may transmit the second measurement value MA of the attester firmware 130 to the bootloader 120 for execution of the attester firmware 130. The bootloader 120 according to some example embodiments may receive the second measurement value MA from the attester firmware 130 and record the received second measurement value MA in the second register 141. When the second measurement value MA is recorded, the register manager 142 according to some example embodiments may prohibit recording of the second register 141 and execute the attester firmware 130 to allow the host 200 to perform a verification operation.

The attester firmware 130 of the memory device 100 according to some example embodiments may read the first measurement value MB, the second measurement value MA, and/or the measurement values of pieces of firmware M1, M2, . . . , Mn and transmit the read value to the host 200. The host 200 according to some example embodiments may transmit a request signal GET_Measurement for measurement values to the attester firmware 130 of the memory device 100. When the request signal GET_Measurement for the measurement values is received, the attester firmware 130 according to some example embodiments may transmit the first measurement value MB, the second measurement value MA, and/or the measurement values M1, M2, . . . , Mn of the plurality of pieces of firmware to the host 200 as the measurement values Measurement of the memory device 100. The measurement values Measurement of the memory device 100 according to some example embodiments may include a first measurement value MB, a second measurement value MA, and measurement values M1, M2, . . . , Mn of the plurality of pieces of firmware, and may include signatures for the first measurement value MB, the second measurement value MA, and/or the measurement values M1, M2, . . . , Mn of the plurality of pieces of firmware.

When measurement values Measurement are received from the memory device 100, the verifier 210 of the host 200 according to some example embodiments may determine whether each, or one or more, component of the memory device 100 is falsified. For example, the verifier 210 compares preset (or alternately given) reference values Ref in the endorsement 220 with the measurement values received from the memory device 100, and determines that each, or one or more, component of the memory device 100 is not falsified but intact when it is determined that the preset (or alternately given) reference values Ref are the same as the measurement values received from the memory device 100 as a result of the comparison. However, when the preset (or alternately given) reference values Ref and the measurement values Measurement received from the memory device 100 are different from each other, the verifier 210 may determine that at least one of the components of the memory device 100 is falsified.

For example, when it is determined that the first measurement value MB received from the memory device 100 is different from the preset (or alternately given) first reference value, the verifier 210 may determine that the bootloader 120 is falsified. In addition, when it is determined that the second measurement value MA received from the memory device 100 is different from the preset (or alternately given) second reference value, the verifier 210 may determine that the attester firmware 130 is falsified. In addition, when it is determined that the measurement values M1, M2, . . . , Mn of the plurality of pieces of firmware, which are received from the memory device 100, are different from the preset (or alternately given) reference values of the plurality of pieces of firmware, the verifier 210 may determine that the plurality of pieces of firmware 150_1, 150_2, . . . , 150_n are falsified.

Referring to FIG. 4B, the first measurement value MB and/or the second measurement value MA of the system 10 according to some example embodiments may be read as the integrated measurement value AM.

For example, the attester firmware 130 may read the first measurement value MB and/or the second measurement value MA, and may read each measurement value by an integrated measurement value AM including the first measurement value MB and/or the second measurement value MA. When the attester firmware 130 according to some example embodiments reads the first measurement value MB and/or the second measurement value MA by the integrated measurement value AM, the second register 141 may receive and store the first measurement value MB from the register manager 142. When the first measurement value MB and/or the second measurement value MA are stored in the second register 141, the attester firmware 130 according to some example embodiments may read the measurement values stored in the second register 141 into the integrated measurement value AM and transmit the same to the host 200. When the integrated measurement value AM is transmitted to the host 200, the measurement value Measurement of the memory device 100 according some example embodiments may include the integrated measurement value AM and measurement values M1, M2, ..., Mn for the plurality of pieces of firmware.

Therefore, according to example embodiments, the host 200 may determine whether the memory device 100 is falsified based on measurement values transmitted by the memory device 100. For example, the host 200 may determine whether the bootloader 120 and/or the attester firmware 130 is falsified. Accordingly, the host 200 may know whether the memory device 100 is determined to be falsified. The host 200 may therefore know why a booting of the device 100 fails. Therefore, the system 10, according to example embodiments, may be able to more accurately diagnose and repair boot problems of a memory device.

Figure 5:
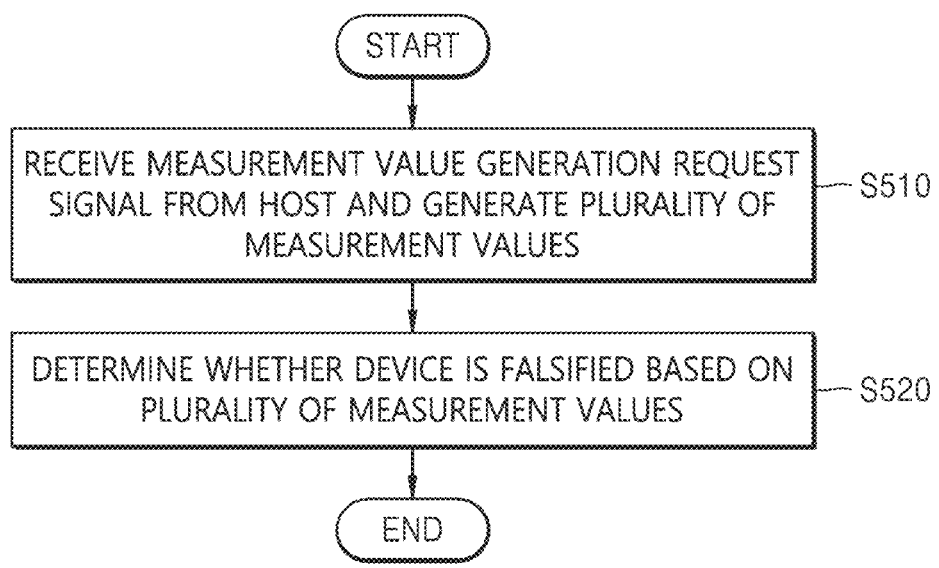
FIG. 5 is a flowchart illustrating an operation method of a memory device according to some example embodiments of the inventive concepts.

FIG. 5 is a flowchart illustrating an operation method of a memory device according to some example embodiments of the inventive concepts.

Referring to FIG. 5, the memory device 100 of the system 10 according to some example embodiments may receive a measurement value generation request signal GET_Measurement from the host 200 and generate a plurality of measurement values Measurement (S510). For example, the host 200 may transmit the measurement value generation request signal GET_Measurement to the memory device 100 to determine whether the components included in the memory device 100 are falsified. When the measurement value generation request signal GET_Measurement is received, the memory device 100 according to some example embodiments may generate the first measurement value MB of the bootloader 120, the second measurement value MA of the attester firmware 130 Attester_FW, and/or the measurement values M1, M2, ..., Mn of the plurality of pieces of firmware FW.

When the plurality of measurement values Measurement are generated, the system 10 according to some example embodiments may determine whether the memory device 100 is falsified based on the plurality of measurement values Measurement (S510).

For example, the memory device 100 of the system 10 may record the first measurement value MB of the bootloader 120 and, when the first measurement value MB is recorded, the second measurement value MA of the attester firmware 130 may be recorded. When the first measurement value MB and/or the second measurement value MA are recorded, the attester firmware 130 according to some example embodiments may transmit the first measurement value MB and/or the second measurement value MA to the host 200. When the first measurement value MB and/or the second measurement value MA are transmitted, the host 200 according to some example embodiments may compare the first measurement value MB and/or the second measurement value MA, with the preset reference values Ref, and determine whether the bootloader 120 and/or the attester firmware 130 are falsified based on the comparison results.

When it is determined that the first measurement value MB received from the memory device 100 is different from the preset (or alternatively given) first reference value, the host 200 according to some example embodiments may determine that the bootloader 120 is falsified. In addition, when it is determined that the second measurement value MA received from the memory device 100 is different from the preset (or alternatively given) second reference value, the host 200 according to some example embodiments may determine that the attester firmware 130 is falsified.

Figure 6:
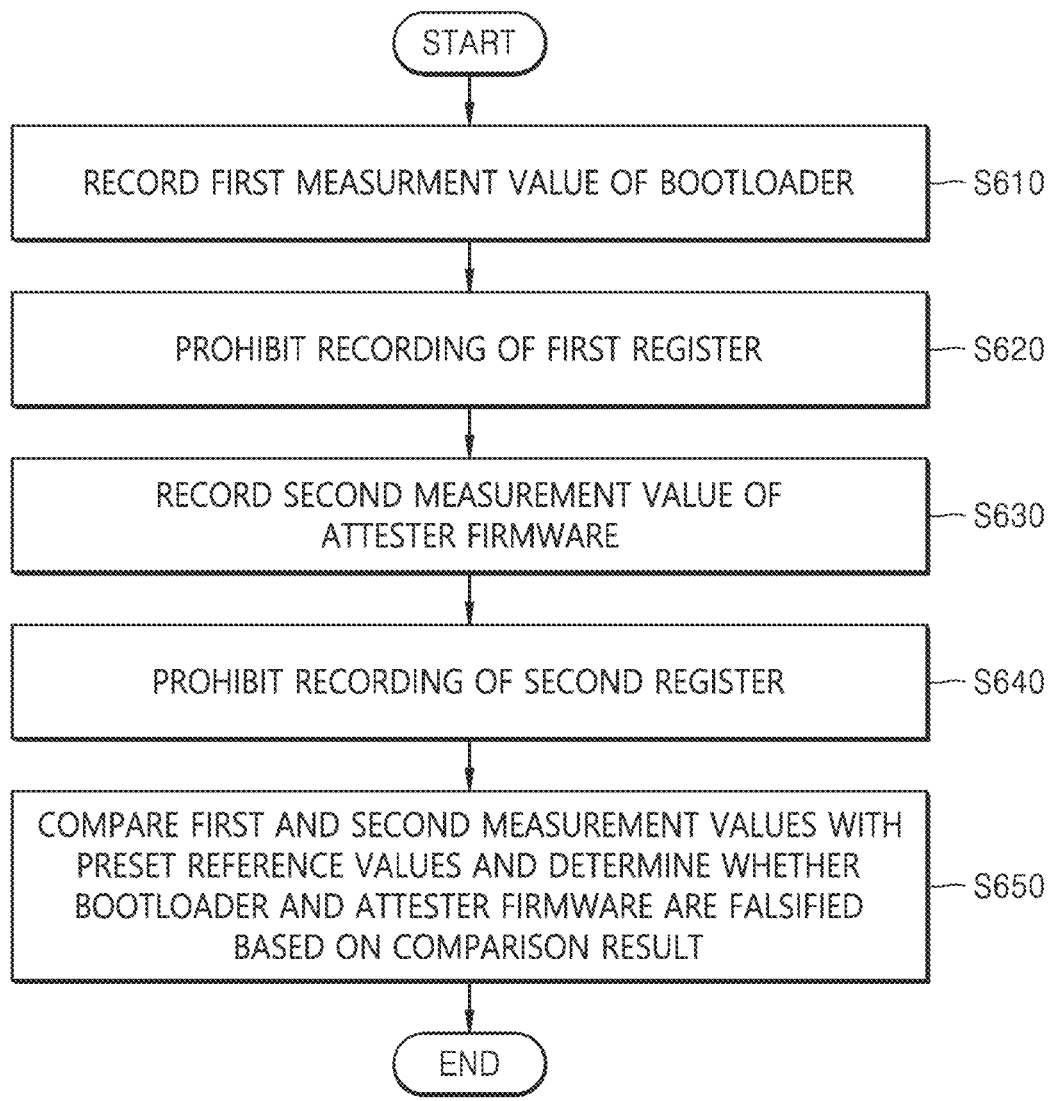
FIG. 6 is a flowchart illustrating a process of determining whether a device is falsified in an operation method of a memory device according to some example embodiments of the inventive concepts.

FIG. 6 is a flowchart illustrating a process of determining whether a device is falsified in an operation method of a memory device according to some example embodiments of the inventive concepts.

Referring to FIG. 6, the system 10 according to some example embodiments may record a first measurement value MB of the bootloader 120 (S610). Before the boot operation of the memory device 100 according some example embodiments is performed, the ROM 110 of the system 10 may receive the first measurement value MB from the bootloader 120 and record the received first measurement value MB in the first register 140.

When the first measurement value MB is recorded, the system 10 according to some example embodiments may prohibit recording of the first register 140 (S620). When the first measurement value MB is recorded, the register manager 142 of the system 10 according to some example embodiments may prohibit recording of the first register 140 and may execute the bootloader 120 to perform a boot operation.

When the first measurement value MB is recorded, the system 10 according to some example embodiments may record the second measurement value MA of the attester firmware 130 (S630). The system 10 according to some example embodiments may transmit the second measurement value MA of the attester firmware 130 to the bootloader 120 for execution of the attester firmware 130. The bootloader 120 according to some example embodiments may receive the second measurement value MA from the attester firmware 130 and record the received second measurement value MA in the second register 141.

When the second measurement value MA is recorded, the system 10 according to some example embodiments may prohibit recording of the second register 141 (S640). When the second measurement value MA is recorded, the register manager 142 according to some example embodiments may prohibit recording of the second register 141 and execute the attester firmware 130 to allow the host 200 to perform a verification operation.

When the first measurement value MB and/or the second measurement value MA are recorded, the system 10 according to some example embodiments may compare the first measurement value MB and/or the second measurement value MA with the preset (or alternatively given) reference values Ref and determine whether the bootloader 120 and/or the attester firmware 130 are falsified (S650).

For example, the system 10 may compare the preset (or alternatively given) reference value Ref with the measurement values Measurement of the memory device 100, and when the comparison results show that the preset (or alternatively given) reference signals Ref and the measurement values Measurement of the memory device 100 are the same, it may be determined that each, or one or more, component of the memory device 100 is not falsified but intact. However, when the preset (or alternatively given) reference values Ref and the measurement values Measurement received from the memory device 100 are different, the system 10 may determine that at least one of the components of the memory device 100 is falsified. The measurement values Measurement of the memory device 100 according to some example embodiments may include the first measurement value MB and/or the second measurement value MA.

Figure 7:
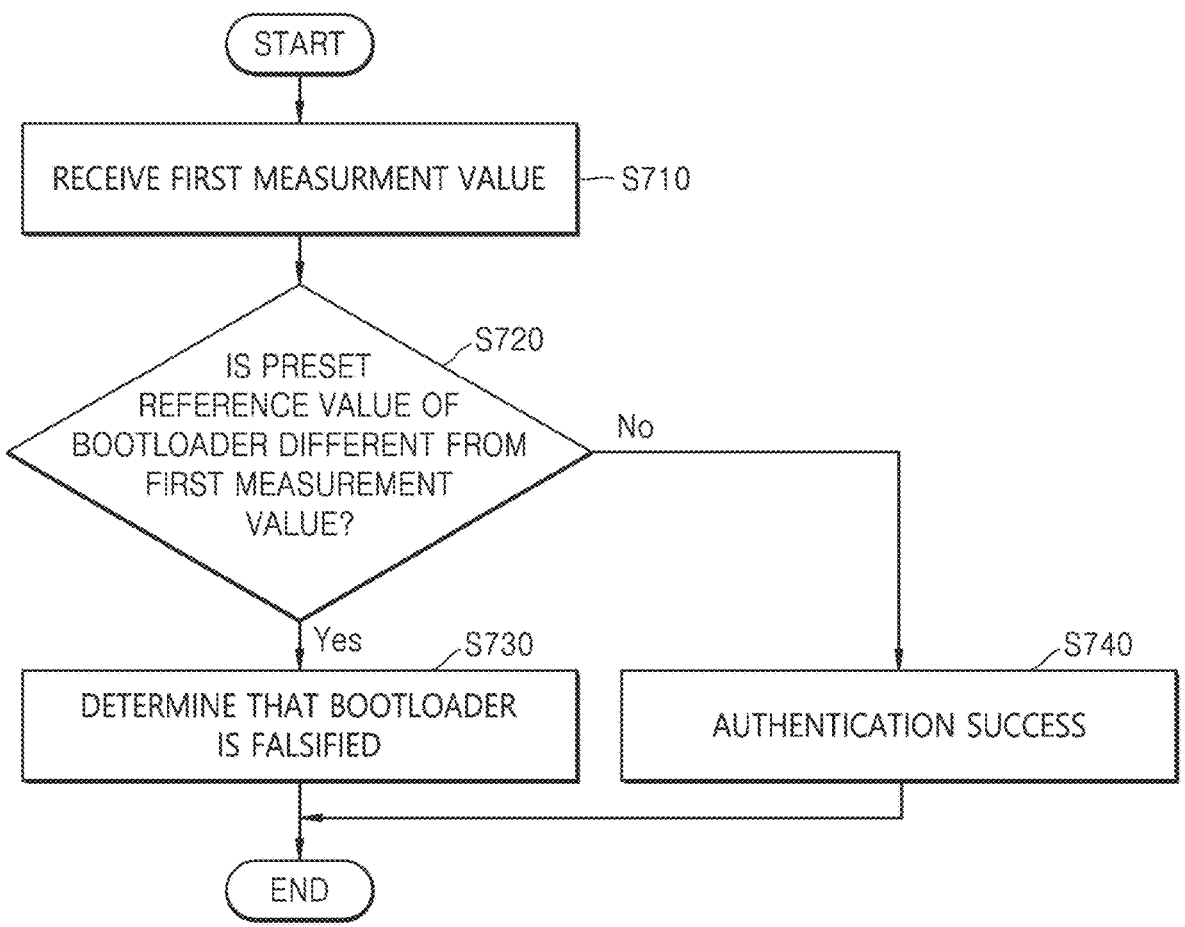
FIG. 7 is a flowchart illustrating a process of determining whether a bootloader is falsified in an operation method of a memory device according to some example embodiments of the inventive concepts.

FIG. 7 is a flowchart illustrating a process of determining whether a bootloader 120 is falsified in an operation method of a memory device according to some example embodiments of the inventive concepts.

Referring to FIG. 7, the host 200 of the system 10 according to some example embodiments may receive a first measurement value MB (S710). For example, the host 200 may receive measurement values Measurement of the memory device 100 including the first measurement value MB from the memory device 100 and select the first measurement value MB.

When the first measurement value MB is received, the system 10 according to some example embodiments may determine whether the first measurement value MB is different from the preset (or alternatively given) reference value of the bootloader 120 (S720). The preset (or alternatively given) reference value of the bootloader 120 according to some example embodiments is a reference value for determining whether the bootloader 120 is falsified, and may be stored in the host 200. For example, the preset (or alternatively given) reference value of the bootloader 120 may be a value input by the manufacturer of the system 10.

When it is determined that the preset (or alternatively given) reference value of the bootloader 120 is different from the first measurement value MB, the system 10 according to some example embodiments may determine that the bootloader 120 is falsified (S730). However, when it is determined that the preset (or alternatively given) reference value of the bootloader 120 and the first measurement value MB are the same, the system 10 according to some example embodiments may determine that the authentication of the bootloader 120 is successful (S740). When it is determined that the authentication of the bootloader 120 is successful, the system 10 may determine that the bootloader 120 is not falsified and perform a boot operation.

Figure 8:
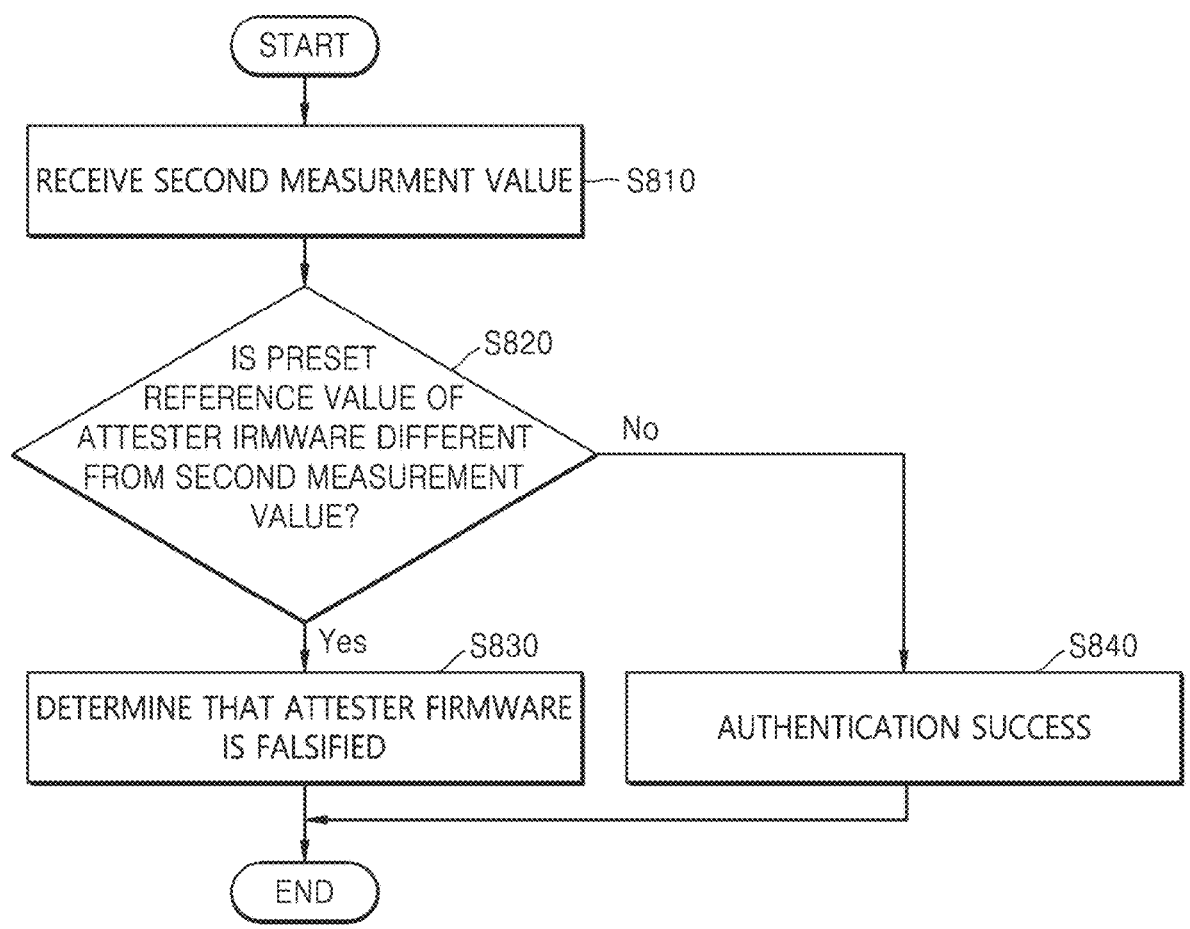
FIG. 8 is a flowchart illustrating a process of determining whether attester firmware is falsified in an operation method of a memory device according to some example embodiments of the inventive concepts.

FIG. 8 is a flowchart illustrating a process of determining whether attester firmware 130 is falsified in an operation method of a memory device according to some example embodiments of the inventive concepts.

Referring to FIG. 8, the host 200 of the system 10 according to some example embodiments may receive a second measurement value MA (S810). For example, the host 200 may receive measurement values Measurement of the memory device 100 including the second measurement value MA from the memory device 100 and select the second measurement value MA.

When the second measurement value MA is received, the system 10 according to some example embodiments may determine whether the preset (or alternatively given) reference value of the attester firmware 130 is different from the second measurement value MA (S820). The preset (or alternatively given) reference value of the attester firmware 130 according to some example embodiments is a reference value for determining whether the attester firmware 130 is falsified, and may be stored in the host 200. For example, the preset (or alternatively given) reference value of the attester firmware 130 may be a value input by the manufacturer of the system 10.

When it is determined that the preset (or alternatively given) reference value of the attester firmware 130 is different from the second measurement value MA, the system 10 according to some example embodiments may determine that the attester firmware 130 is falsified (S830). However, when it is determined that the preset (or alternatively given) reference value of the attester firmware 130 and the second measurement value MA are the same, the system 10 according to some example embodiments may determine that the authentication of the attester firmware 130 is successful (S840). When it is determined that authentication of the attester firmware 130 is successful, the system 10 may determine that the attester firmware 130 is not falsified and perform an authentication operation on the plurality of pieces of firmware present in the memory device 100.

Figure 9:
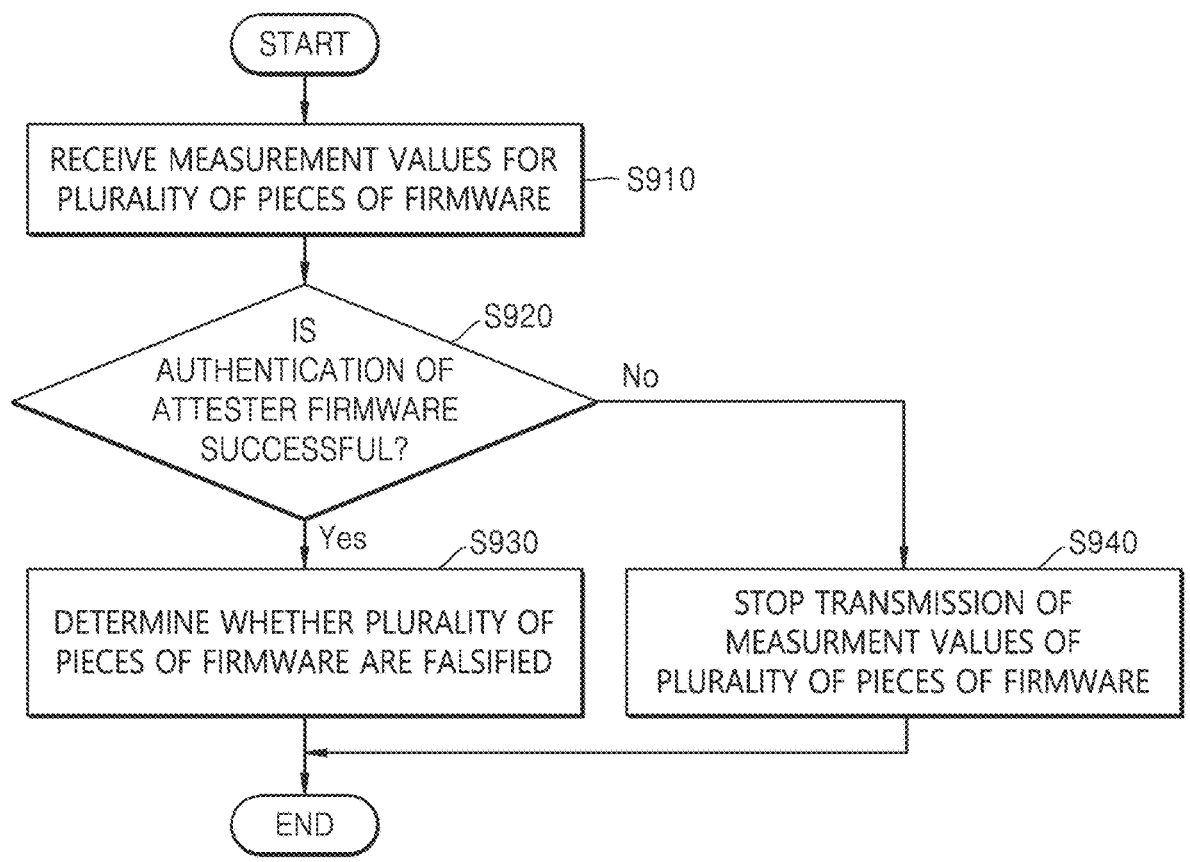
FIG. 9 is a flowchart illustrating a process of determining whether a plurality of pieces of firmware are falsified in an operation method of a memory device according to some example embodiments of the inventive concepts.

FIG. 9 is a flowchart illustrating a process of determining whether a plurality of pieces of firmware are falsified in an operation method of a memory device according some example embodiments of the inventive concepts.

Referring to FIG. 9, the host 200 of the system 10 according to some example embodiments may receive measurement values M1, M2, . . . , Mn for a plurality of pieces of firmware (S910). The measurement values M1, M2, . . . , Mn for the plurality of pieces of firmware according to some example embodiments may be included in measurement values Measurement of the memory device 100 and transmitted to the host 200.

When the measurement values M1, M2, . . . , Mn for the plurality of pieces of firmware are received, the system 10 according some example embodiments may determine whether authentication of the attester firmware 130 is successful (S920).

The system 10 according to some example embodiments may authenticate the attester firmware 130 by comparing the preset (or alternatively given) reference value of the attester firmware with the second measurement value MA received from the memory device 100. For example, when it is determined that the preset (or alternatively given) reference value of the attester firmware 130 and the second measurement value MA are different, the system 10 according to some example embodiments may determine that the attester firmware 130 has been falsified and that authentication has failed. However, when it is determined that the preset (or alternatively given) reference value of the attester firmware 130 and the second measurement value MA are the same, the system 10 according to some example embodiments may determine that the authentication of the attester firmware 130 is successful.

When it is determined that authentication of the attester firmware 130 is successful, the system 10 according to some example embodiments may determine whether a plurality of pieces of firmware 150_1, 150_2, . . . , 150_n are falsified (S930).

It may be determined whether the plurality of pieces of firmware 150_1, 150_2, . . . , 150_n according to some example embodiments are falsified by comparing a preset (or alternatively given) reference value of each piece of firmware with the measurement values M1, M2, . . . , Mn of the plurality of pieces of firmware, which are received from the memory device 100. For example, when it is determined that the preset (or alternatively given) reference values of the plurality of pieces of firmware and the measurement values M1, M2, . . . , Mn of the plurality of pieces of firmware, which are received from the memory device 100, are different, the system 10 according to some example embodiments may determine that firmware is falsified in which the preset (or alternatively given) values of the plurality of pieces of firmware 150_1, 150_2, . . . , 150_n do not match the measurement values received from the memory device 100. However, when it is determined that the preset (or alternatively given) reference values of the plurality of pieces of firmware and the measurement values M1, M2, . . . , Mn of the plurality of pieces of firmware, which are received from the memory device 100, are the same, the system 10 according to some example embodiments may determine that the plurality of pieces of firmware 150_1, 150_2, . . . , 150_n are not falsified.

When it is determined that authentication of the attester firmware 130 has failed, the system 10 according to some example embodiments may stop transmitting the measurement values M1, M2, . . . , Mn of the plurality of pieces of firmware 150_1, 150_2, . . . , 150_n (S940). For example, when it is determined that authentication of the attester firmware 130 fails and the attester firmware 130 is falsified, the system 10 may determine that there is an error in the booting process of the memory device 100 and may stop transmitting the measurement values of the plurality of pieces of firmware 150_1, 150_2, . . . , 150_n.

Figure 10:
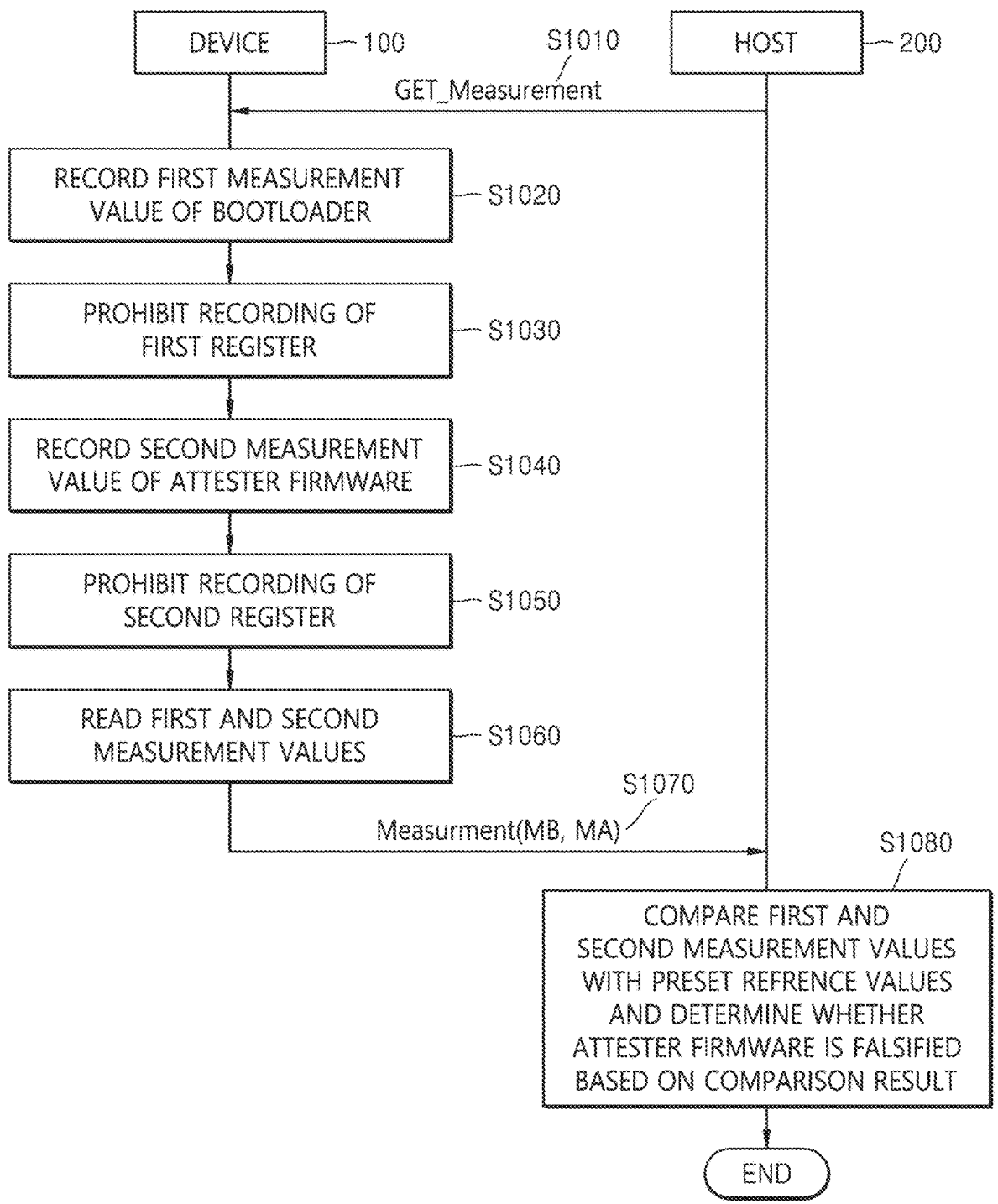
FIG. 10 is a flowchart illustrating a process of determining whether a device is falsified in an operation method of a memory device according to some example embodiments of the inventive concepts.

FIG. 10 is a flowchart illustrating a process of determining whether a device is falsified in an operation method of a memory device according to some example embodiments of the inventive concepts.

Referring to FIG. 10, the system 10 according to some example embodiments may determine whether each, or one or more, component of the memory device 100 is falsified to perform a safe booting operation. The host 200 according to some example embodiments may transmit a measurement value generation request signal GET_Measurement to the memory device 100 to determine whether the memory device 100 is falsified (S1010).

When the measurement value generation request signal GET_Measurement is received by the memory device 100, the system 10 according to some example embodiments may record the first measurement value MB of the bootloader 120 (S1020). Before the boot operation of the memory device 100 according to some example embodiments is performed, the ROM 110 of the system 10 may receive the first measurement value MB from the bootloader 120 and record the received first measurement value MB in the first register 140.

When the first measurement value MB is recorded, the system 10 according to some example embodiments may prohibit recording of the first register 140 (S1030). When the first measurement value MB is recorded, the register manager 142 of the system 10 according to some example embodiments may prohibit recording of the first register 140 and may execute the bootloader 120 to perform a boot operation.

When the first measurement value MB is recorded, the system 10 according to some example embodiments may record the second measurement value MA of the attester firmware 130 (S1040). The system 10 according to some example embodiments may transmit the second measurement value MA of the attester firmware 130 to the bootloader 120 for execution of the attester firmware 130. The bootloader 120 according to some example embodiments may receive the second measurement value MA from the attester firmware 130 and record the received second measurement value MA in the second register 141.

When the second measurement value MA is recorded, the system 10 according to some example embodiments may prohibit recording of the second register 141 (S1050). When the second measurement value MA is recorded, the register manager 142 according to some example embodiments may prohibit recording of the second register 141.

When the first measurement value MB and the second measurement value MA are recorded, the system 10 according to some example embodiments may read the first measurement value MB and/or the second measurement value MA (S1060). For example, the attester firmware 130 of the system 10 may read the first measurement value MB and/or the second measurement value MA, which are stored in the first register 140 and the second register 141, respectively.

When the first measurement value MB and/or the second measurement value MA are read, the memory device 100 of the system 10 according to some example embodiments may transmit the measurement values Measurement to the host 200 (S1070). For example, the system 10 may transmit measurement values Measurement including the first measurement value MB, the second measurement value MA, and/or the measurement values M1, M2, . . . , Mn for the plurality of pieces of firmware to the host 200.

When the measurement values Measurement of the memory device 100 are transmitted to the host 200, the system 10 according to some example embodiments may compare the first measurement value MB and/or the second measurement value MA with the preset (or alternatively given) reference values Ref and determine whether the bootloader 120 and/or the attester firmware 130 are falsified (S1080).

For example, the system 10 may compare the preset (or alternatively given) reference value Ref with the measurement values Measurement of the memory device 100, and when the comparison results show that the preset (or alternatively given) reference signals Ref and the measurement values Measurement of the memory device 100 are the same, it may be determined that each, or one or more, component of the memory device 100 is not falsified but intact. However, when the preset (or alternatively given) reference values Ref and the measurement values Measurement received from the memory device 100 are different, the system 10 may determine that at least one of the components of the memory device 100 is falsified. The measurement values Measurement of the memory device 100 according to some example embodiments may include the first measurement value MB and/or the second measurement value MA.

Figure 11:
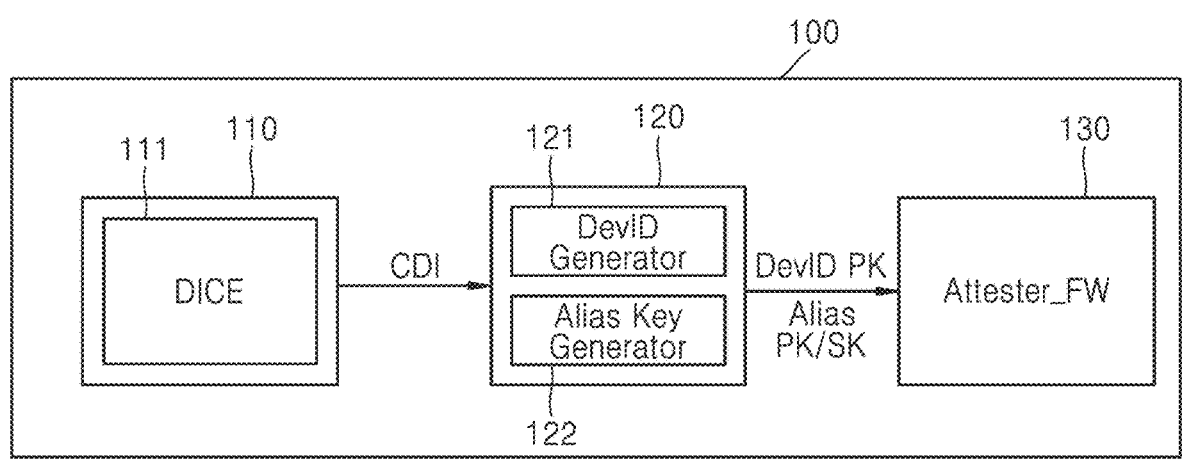
FIG. 11 is a block diagram of a memory device according to some example embodiments of the inventive concepts.

FIG. 11 is a block diagram of a memory device 100 in a system 10 according to some example embodiments of the inventive concepts.

Referring to FIG. 11, when a security protocol and data model (SPDM) is applied to the system 10 according to some example embodiments, a memory device 100, ROM 110, a bootloader 120, and/or attester firmware 130 may be included.

The ROM 110 according to some example embodiments may include a device identification engine (DICE) 111. For example, the DICE 111 may generate a device identification operator CDI for verifying the bootloader 120 and transmit the generated device identification operator CDI to the bootloader 120.

The bootloader 120 according to some example embodiments may include a device ID generation unit 121 and an alias key generation unit 122.

The device ID generation unit 121 according to some example embodiments may generate a unique device ID key DevID PK. The unique device ID key DevID PK according to some example embodiments may be a public key for authenticating the memory device 100.

The alias key generation unit 122 may receive a device identification operator CDI from the device identification engine 111 and generate an alias key. The alias key may be generated as an asymmetric pair of an alias private key Alias_SK and an alias public key Alias_PK. Here, an alias key pair Alias_SK and Alias_PK may be temporary keys for authenticating device information, and may be transmitted to the attester firmware 130.

The attester firmware 130 according to some example embodiments may receive the unique device ID key DevID PK, the alias private key Alias_SK, and/or the alias public key Alias_PK and determine whether the bootloader 120 of the memory device 100 is changed.

The system 10 according to some example embodiments described above may be implemented in the form of an authentication system of the system 10. For example, the memory device 100 and/or the host 200 according to some example embodiments may be provided in any memory device to perform an authentication operation of the corresponding memory device.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference some example embodiments thereof, it will be understood that various changes in form and details may be made therein without departing from the spirit and scope of the following claims.

What is claimed is:

1. A system comprising:
 a memory device including
  an interface configured to receive a measurement value generation request signal from a host and transmit a first measurement value of a bootloader and a second measurement value for an attester firmware to the host,
  the attester firmware configured to receive measurement values for a plurality of pieces of firmware,
  the bootloader configured to perform booting,
  a first register configured to record the first measurement value of the bootloader, and
  a second register configured to record the second measurement value for the attester firmware in response to the first measurement value being recorded; and
 the host including processing circuitry configured to
  receive the first measurement value and the second measurement value, and determine whether to falsify the bootloader and the attester firmware based on both (1) the first measurement value and first reference values and (2) the second measurement value and second reference values.

2. The system of claim 1, wherein the memory device comprises:
 a register manager configured to
 control the recording of the first register and the second register, and
 prohibit recording of the first register in response to the first measurement value being recorded in the first register.

3. The system of claim 2, wherein the register manager is configured to:
 record the second measurement value in the second register in response to the first measurement value being recorded; and
 prohibit recording of the second register in response to the second measurement value being recorded in the second register.

4. The system of claim 1, wherein the processing circuitry is configured to:
 determine that the bootloader is falsified in response to a reference value of the bootloader being different from the first measurement value.

5. The system of claim 1, wherein the processing circuitry is configured to:
 determine that the attester firmware is falsified in response to a reference value of the attester firmware being different from the second measurement value.

6. The system of claim 1, wherein the processing circuitry is configured to:
 receive measurement values for the plurality of pieces of firmware from the attester firmware; and
 determine whether the plurality of pieces of firmware are falsified based on the received measurement values for the plurality of pieces of firmware.

7. The system of claim 1, wherein the memory device further includes read-only memory (ROM) configured to perform authentication for the bootloader,
 wherein the bootloader is configured to execute in response to the first measurement value being recorded in the first register, and
 the second register is configured to record the second measurement value in response to the bootloader being executed.

8. An operation method of a system, the method comprising:
 receiving a measurement value generation request signal from a host;
 recording a first measurement value of a bootloader;
 recording a second measurement value of an attester firmware in response to the first measurement value being recorded, the attester firmware configured to receive measurement values for a plurality of pieces of firmware; and
 determining whether to falsify the bootloader and the attester firmware based on both (1) the first measurement value and first reference values and (2) the second measurement value and second reference values.

9. The method of claim 8, further comprising:
 prohibiting a recording of a first register in response to the first measurement value being recorded in the first register.

10. The method of claim 9, further comprising:
 recording the second measurement value in a second register in response to the first measurement value being recorded; and
 prohibiting recording of the second register in response to the second measurement value being recorded in the second register.

11. The method of claim 8, further comprising:
 determining that the bootloader is falsified in response to a reference value of the bootloader being different from the first measurement value.

12. The method of claim 8, further comprising:
 determining that the attester firmware is falsified in response to a reference value of the attester firmware being different from the second measurement value.

13. The method of claim 8, further comprising:
 receiving measurement values for the plurality of pieces of firmware from the attester firmware; and
 determining whether the plurality of pieces of firmware are falsified based on the received measurement values for the plurality of pieces of firmware.

14. The operation method of a memory device of claim 8, further comprising:

generating the first measurement value by performing authentication on the bootloader;
executing the bootloader in response to the first measurement value being recorded in a first register; and
recording the second measurement value in a second register in response to the bootloader being executed.

15. An authentication system comprising:
a memory device including
an interface configured to receive a measurement value generation request signal from a host and transmit a first measurement value of a bootloader and a second measurement value for an attester firmware to the host,
the attester firmware configured to receive measurement values for a plurality of pieces of firmware,
the bootloader configured to perform booting,
a first register configured to record the first measurement value of the bootloader, and
a second register configured to record the second measurement value for the attester firmware in response to the first measurement value being recorded; and
the host including processing circuitry configured to
receive the first measurement value and the second measurement value, and
determine whether to falsify the bootloader or the attester firmware based on at least one of (1) the first measurement value and first reference values or (2) the second measurement value and second reference values.

16. The authentication system of claim 15, wherein the memory device comprises:
a register manager configured to
control the recording of the first register and the second register, and
prohibit recording of the first register in response to the first measurement value being recorded in the first register.

17. The authentication system of claim 16, wherein the register manager is configured to:
record the second measurement value in the second register in response to the first measurement value being recorded; and
prohibit recording of the second register in response to the second measurement value being recorded in the second register.

18. The authentication system of claim 15, wherein the processing circuitry is configured to:
determine that the bootloader is falsified in response to a reference value of the bootloader being different from the first measurement value.

19. The authentication system of claim 15, wherein the processing circuitry is configured to:
determine that the attester firmware is falsified in response to a reference value of the attester firmware being different from the second measurement value.

20. The authentication system of claim 15, wherein the processing circuitry is configured to:
receive measurement values for the plurality of pieces of firmware from the attester firmware; and
determine whether the plurality of pieces of firmware are falsified based on the received measurement values for the plurality of pieces of firmware.

* * * * *